(12) United States Patent
Foreman

(10) Patent No.: US 12,305,755 B1
(45) Date of Patent: *May 20, 2025

(54) FLOAT VALVE ASSEMBLY FOR FLUID CONTAINER

(71) Applicant: Joseph F. Foreman, Troy, MO (US)

(72) Inventor: Joseph F. Foreman, Troy, MO (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/136,388

(22) Filed: Apr. 19, 2023

Related U.S. Application Data

(63) Continuation-in-part of application No. 17/381,016, filed on Jul. 20, 2021, now Pat. No. 11,662,021, which is a continuation-in-part of application No. 29/729,196, filed on Mar. 24, 2020, now Pat. No. Des. 927,636, and a continuation-in-part of application No. 16/696,787, filed on Nov. 26, 2019, now Pat. No. 11,079,018, said application No. 29/729,196 is a continuation of application No.
(Continued)

(51) Int. Cl.
| | |
|---|---|
| *F16J 13/08* | (2006.01) |
| *B60T 17/22* | (2006.01) |
| *B65D 8/00* | (2006.01) |
| *F16J 13/24* | (2006.01) |
| *F17C 1/16* | (2006.01) |

(52) U.S. Cl.
CPC ............ *F16J 13/08* (2013.01); *B60T 17/222* (2013.01); *B65D 15/14* (2013.01); *F16J 13/24* (2013.01); *F17C 1/16* (2013.01); *F17C 2201/0104* (2013.01); *F17C 2205/0323* (2013.01)

(58) Field of Classification Search
CPC .......... F16J 13/08; F16J 13/24; B60T 17/222; B60T 17/18; B65D 15/14; F17C 1/16; F17C 2201/0104; F17C 2205/0323
See application file for complete search history.

(56) References Cited

U.S. PATENT DOCUMENTS

| | | |
|---|---|---|
| 2,670,874 A | 3/1954 | Wilkerson |
| 2,872,951 A | 2/1959 | Wilkerson |
| | (Continued) | |

OTHER PUBLICATIONS

BG PF7 Brake Service System Reference Manual, 2011, BG Products, Inc., Wichita, Kansas.
(Continued)

*Primary Examiner* — Shawn M Braden
(74) *Attorney, Agent, or Firm* — Carmody MacDonald P.C.; Dennis J M Donahue, III; Kevin C. Staed

(57) ABSTRACT

A container for exchanging fluids in a vehicle using a pressurized air service or a vacuum service has a tank for holding a new fluid that is used to replace the old fluid that is in the vehicle. The container has a cap at the tank's top end, and an outlet port extends through the cap. A process tube connects to the outlet port at its proximal end, and a float valve assembly with a ball float connects to the process tube's distal end. The float valve assembly's base is positioned at the bottom of the tank when the tank is sealed and is spaced away from the bottom when the tank is unsealed. The base has an entrance port, an exit port, and an internal passageway therebetween, and the ball float moves between an open configuration spaced from the entrance port and a closed configuration covering the entrance port.

20 Claims, 9 Drawing Sheets

Related U.S. Application Data

16/696,787, filed on Nov. 26, 2019, now Pat. No. 11,079,018.

(60) Provisional application No. 62/771,396, filed on Nov. 26, 2018.

(56) References Cited

U.S. PATENT DOCUMENTS

| | | | |
|---|---|---|---|
| 3,005,669 A * | 10/1961 | Nunnemacher | F16J 10/02 |
| | | | 92/161 |
| 3,421,543 A | 1/1969 | Montag | |
| 3,966,085 A | 6/1976 | Norton | |
| 4,655,328 A | 4/1987 | Tideberg | |
| 5,287,834 A | 2/1994 | Flynn | |
| 5,833,765 A | 11/1998 | Flynn | |
| 6,073,638 A | 6/2000 | Sasaki | |
| 6,330,934 B1 | 12/2001 | Viken | |
| 7,096,894 B1 | 8/2006 | Hollub | |
| 10,683,966 B2 | 6/2020 | Xiao et al. | |
| 2002/0144715 A1 * | 10/2002 | Connors | F02M 35/10222 |
| | | | 134/22.18 |

OTHER PUBLICATIONS

HD Diesel Fuel Tool—Fuel RX 800 [online], Engine Clean Solutions, Inc. Retrieved from the Internet on Nov. 2, 2019 <URL: www.engineclean.com//files/126593481.pdf>.

TerraDiesel EGR Cleaning Tool Part # 201170 [online], TerraClean. Retrieved from the Internet on Nov. 20, 2019 <URL: www.terraclean.net/product/terradiesel-egr-cleaning-tool-part-201170/>.

* cited by examiner

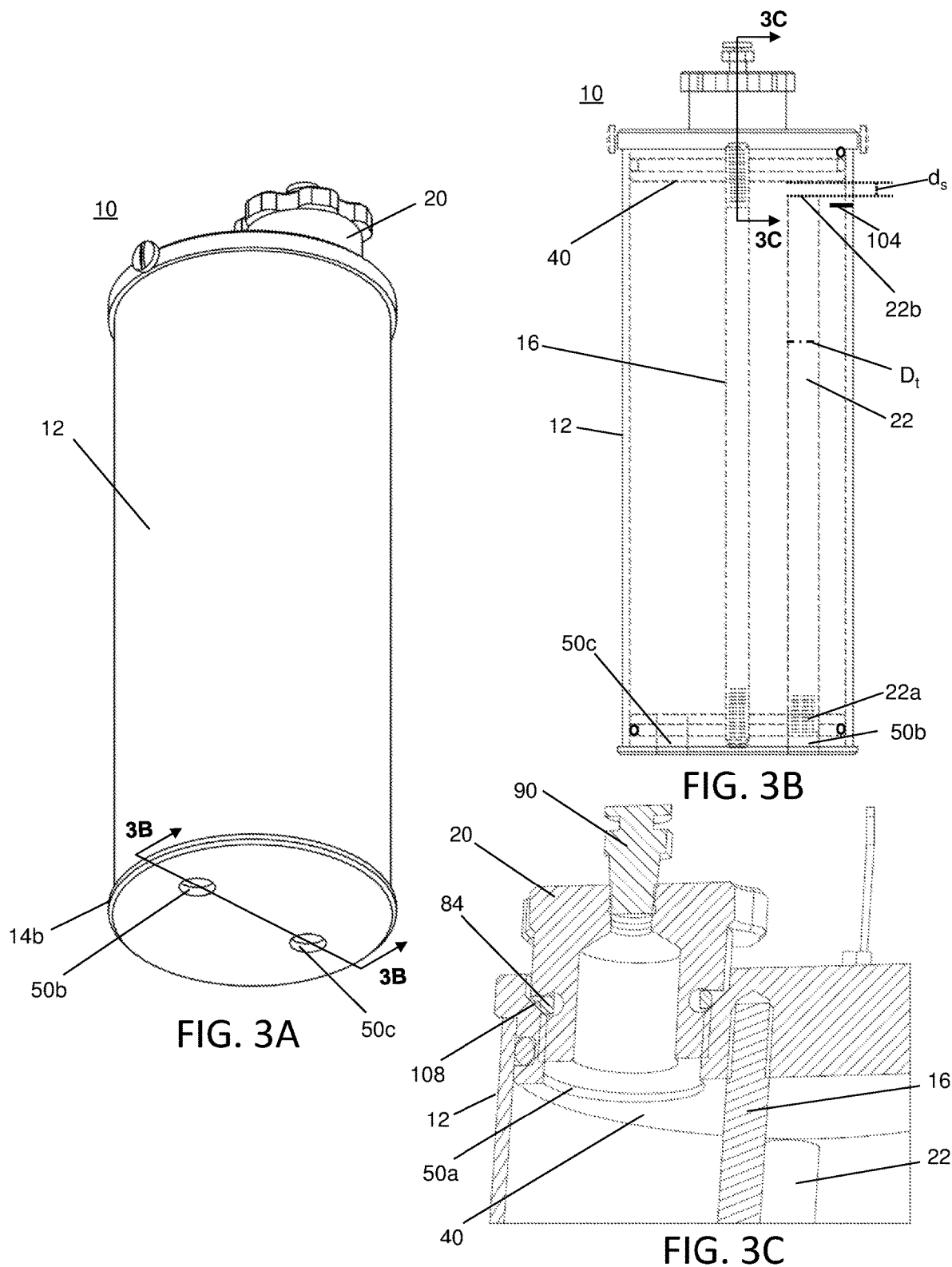

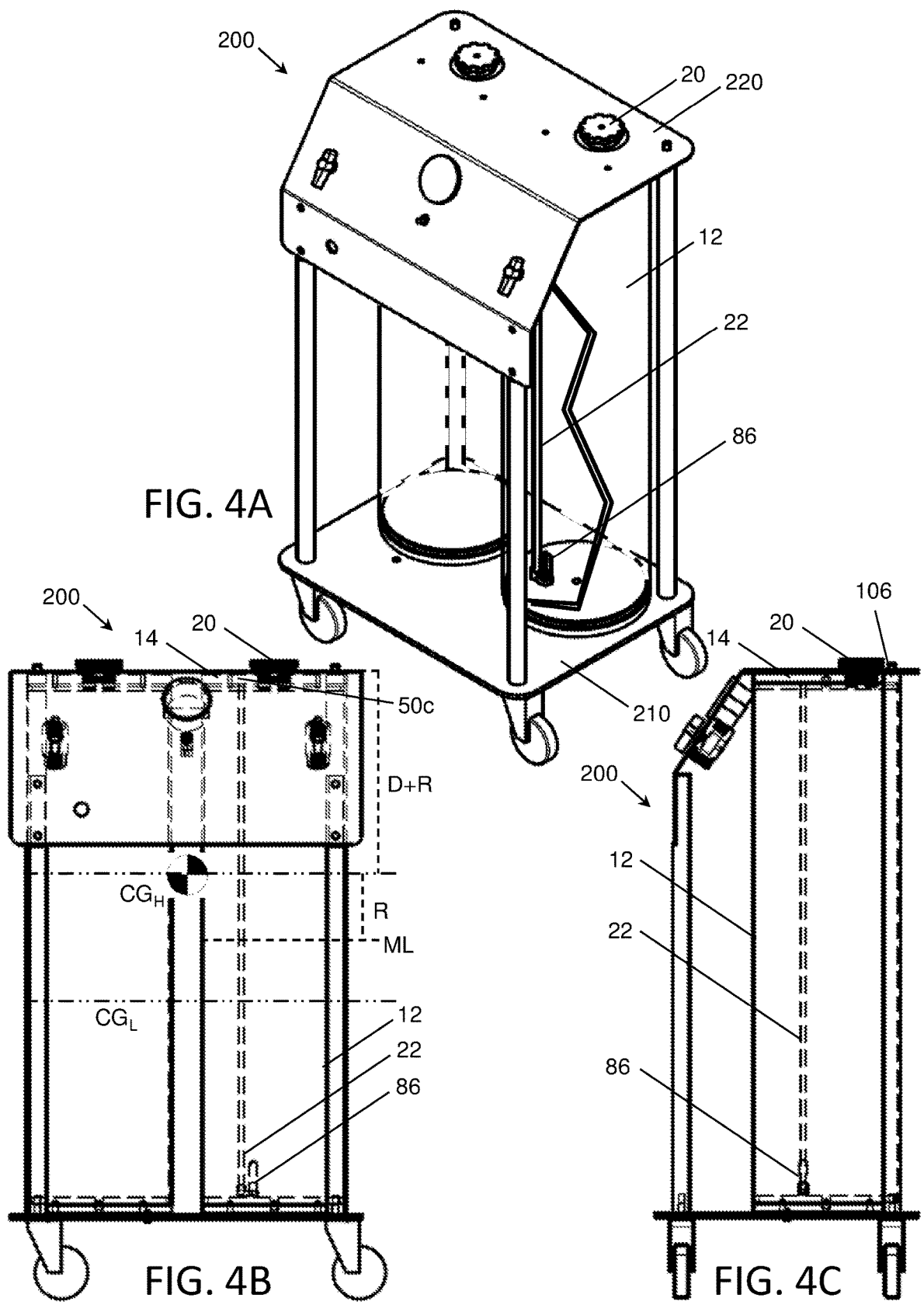

FLOAT VALVE ASSEMBLY FOR FLUID CONTAINER

CROSS-REFERENCE TO RELATED APPLICATIONS

This application is a continuation-in-part of U.S. patent application Ser. No. 17/381,016 filed on Jul. 20, 2021 which is a continuation-in-part of U.S. patent application Ser. No. 16/696,787 filed on Nov. 26, 2019 and issued as U.S. Pat. No. 11,079,018 on Aug. 3, 2021 and which claims priority to U.S. Provisional Patent Application No. 62/771,396 filed on Nov. 26, 2018, and U.S. patent application Ser. No. 17/381,016 is also a continuation-in-part of U.S. Design patent application Ser. No. 29/729,196 filed on Mar. 24, 2020 and issued as U.S. Design Pat. No. D927,636 which is a continuation of the aforementioned U.S. patent application Ser. No. 16/696,787 filed on Nov. 26, 2019, all of which are hereby incorporated by reference in their entireties.

STATEMENT REGARDING FEDERALLY SPONSORED RESEARCH

Not Applicable.

APPENDIX

Not Applicable.

BACKGROUND OF THE INVENTION

Field of the Invention

The present invention relates to containers for fluids in the servicing of vehicles, and more particularly to containers that have a fill port for receiving a fluid and also have a process tube within the container which extends to an outlet port for the fluid to exit the container.

Related Art

Fluid containers capable of maintaining pressure from a pressurized air source while fluid flows out of the container have been used as part of fluid servicing tools for brake bleeding, fuel injection and fuel induction as well as for other fluid servicing operations common performed on automobiles. Although the design, function and various elements of the tools can vary between the various intended uses, it is generally an aspect of these servicing tools to provide a fluid container that can be sealed to maintain the pressure of the pressurized air source that is supplied to the container. Accordingly, these servicing tools require air tight seals capable of maintaining adequate pressure within the tool during use. As with other tools and systems, it is generally a desire to those having an ordinary skill in the art to provide a simpler tool having less parts and having improved functionality. Thus, there remains a need in the art to provide an improved fluid container that can be used with the various tools for servicing automobile fluids.

Generally, brake bleeding is a procedure which purges brake lines of air bubbles by replacing old brake fluid with new fluid. The process is performed by forcing clean, bubble-free brake fluid though the entire brake system from the master cylinder to the calipers of disc brakes, or in the opposite direction. Although other methods may exist, the five (5) most common methods of effectively bleeding breaks include the pump and hold method, the vacuum method, the pressure method, the reverse method and gravity bleeding. Of the most common methods listed above, the vacuum method, pressure method and reverse method incorporate specialized brake bleeding tools which incorporate pressurized fluid containers to expedite the process. In comparison, the pump and hold method and the gravity bleeding method do not necessarily include specialized break bleeding pumps but typically take more time or require additional manpower.

As brake bleeding is a common maintenance procedure regularly performed on automobiles, various types of servicing tools have been designed to be used by both professional mechanics and at home hobbyists. At home tools include pneumatic vacuum brake fluid tools that are low cost and do not require adapters, but generally are slow. Similarly, hand pump pressure brake fluid tools have been designed that are often used in at home shops or independent service shops which may effectively exchange brake fluid but require hand power and are generally slow. Other more complex tools have been designed which integrate pneumatic and electric brake tools and machines that are often used in larger mechanics shops. These more complex machines include smaller single line machines as well as multi-line machines that allow for multiple wheel service. However, problems arise with the more complex machines where the additional features and electric pumps lead to more maintenance failures as compared to pneumatic machines. Thus, there remains a need for a simple servicing tool that is not prone to the problems associated with more complex machines while still capable of providing the speed and ease of use as the larger machines.

Other services commonly performed on automobiles that are similar to brake bleeding include fuel induction servicing, fuel injection servicing, exhaust gas recirculation (EGR) servicing, diesel EGR servicing, diesel injection servicing, engine oil servicing, transmission servicing, coolant servicing, and power steering servicing. Of these various servicing procedures, there is a range in the complexity, size, and cost of the tools that are used for these services. For example, as evident from U.S. Pat. No. 2,670,874, for simple fluid servicing tools, it has been known for several decades to use a float valve with the fluid delivery tube that extends from the bottom of a fluid reservoir to prevent air from being pushed or drawn into the vehicle lines if the fluid in the reservoir runs dry. For the float valve to work in these tools, the fluid delivery tube necessarily connected to the bottom of the reservoir's container. The float valve would not work with other fluid servicing tools that had a tube extending from the top of the container into the fluid. Accordingly, there remained a need for a float valve that could be used in fluid servicing tools in which a tube extended from the top of the container into the fluid.

Within the past several years, rather than using a float valve, more complicated fluid servicing tools have used electrically powered sensors and control systems to provide the operator with a warning when the reservoir is nearly empty. Fluid servicing tools that use sensors and control systems can be used with fluid containers in which the fluid is pushed or drawn through a tube that extends down into the fluid from the top of the container, such as disclosed in U.S. Pat. No. 7,096,894 which is incorporated by reference herein. Even with all of the options for the current tools, there remains a desire for an improved fluid container that can be used in various vehicle servicing tools which generally reduces the total number of parts that may cause failure of the tool while also reducing the likelihood of a tool malfunction. Rather than having fluid servicing equipment that requires electrical power for sensors and a control panel, in some instances, it would be preferable to have fluid servicing equipment in which the entire servicing can be performed using pressure or vacuum from the shop or the vehicle without requiring any power cords or a control system while also providing a mechanical check valve that prevents air from being pushed or drawn into the vehicle lines if the fluid in the reservoir runs dry.

For fluid servicing equipment that integrates tools with rolling carts, such as the '894 patent, ergonomic factors can be almost as important to the operators of the equipment as the technology in these devices. For example, in addition to using sensors, controllers, and a computer processor, the '894 patent discloses a fluid servicing equipment that has a top area which has a console in its rear horizontal half with a display and data entry unit that is slightly above the waste-height of a typical operator and which also has a recessed tray in its forward horizontal for holding tools. As with most other carts for fluid servicing equipment, the '894 patent only provides a very small horizontal space that could be used for writing and is too small to hold a standard letter-sized clipboard, i.e., the space in front of the indicia reader. Additionally, the '894 patent's cart design requires the extension of the operator's hands over the front horizontal half of the top area to operate the controls. It would be beneficial to improve the ergonomics of a tool and cart assembly in which the plumbing is at the top, under the top panel, so the control panel is closer to the operator than the space to hold tools eliminating the need to extend past the front half. It would also be an improvement to provide a horizontal working surface that is large enough to place and write on a standard letter-sized clipboard.

SUMMARY OF THE INVENTION

The invention is a fluid container for servicing fluids in vehicles. An internal process tube extends from a port in a cap at the top side of the tank down to the bottom of the tank which allows the fluid in the tank to be pushed up or sucked up through the outlet port in the top cap, and the process tube includes a float valve that opens when there is sufficient fluid in the tank to flow out of the outlet port and closes when the fluid in the tank gets so low that there is insufficient fluid remaining in the tank to flow out of the outlet port. Accordingly, the inventive float valve does not require the fluid to exit through the bottom of the tank as commonly seen in existing float valve designs.

In another aspect of the invention, the container has seals capable of holding a pressure of approximately one hundred and fifty pounds per square inch (150 PSI) or more and which has access ports on one end cap through which fluid flows into and out of the container. The fluid container particularly described herein is intended to be used for holding automobile fluids that are used in the process of exchanging old fluids with new fluids, and it will be appreciated that the innovative fluid container and seal may be used for other purposes. The fluid container tool described herein includes a single threaded tie rod in the center of the tank, a pair of end caps on each end of the tank, and an annular seal. The internal tie rod eliminates the need for additional pressure boundaries found in the end cap designs commonly used in the prior art in which the tie rods are fastened through apertures in the end caps. Additionally, the internal tie rod allows for a simpler assembly with screw-on end caps that snuggly fit against each end of the tank. Accordingly, it is an aspect of the invention to have access valves allowing fluid exchange while limiting unnecessary pressure boundaries by reducing the number of fasteners required for securing the end caps to the container.

The annular seal is preferably formed by an O-ring that is seated within a groove in a flange on each of the end caps and that is radially compressed against the interior sidewalls of the tank as the flange of the end cap is pulled within the interior of the tank which allows for pressurized sealing of the container even when the end caps are not fully tightened on the tie rod so that the head of the end caps are not tightly seated against the ends of the tank. It is another aspect of the invention to provide a pressure seal even when the end caps are not fully seated against the ends of the tank and without the need for any axial compression of O-rings or any other seals between the end caps and the ends of the tank.

The container is preferably made from a cylindrical translucent tank so that the fluid level within the container can be visibly determined by a technician. The caps are affixed to their respective positions on opposite ends of the cylindrical container by the central tie rod threadedly connected to a center point of each cap. Each cap includes integrated tie rod mounts that allow the sidewalls of the cap to be used to hand-tighten the caps to the tank as the O-rings are radially compressed against the internal sidewalls of the tank. Accordingly, it is another aspect of the invention to have integrated fasteners within each end cap wherein a separate tool and fastener are not required to adequately tighten the end caps to maintain pressure within the fluid container.

The inlet port and outlet port are both integrated into the top end cap which leaves the bottom end cap unencumbered from any fittings, couplings, pipes, tubes, hoses, or other fluid connections and allows the container to be freestanding, such as on the technician's work bench, thereby improving the ease of use of the tool. A threaded fill port is also provided in the top end cap to allow for filling the tank with fluids, and a threaded plug screws into and seals the fill port. Additional areas of applicability are explained in the detailed description.

BRIEF DESCRIPTION OF THE DRAWINGS

The present invention will become more fully understood from the detailed description and the accompanying drawings, wherein:

FIG. 3A is an isometric view of an alternative embodiment of the fluid container according to the present invention.

FIG. 3B is a cross-sectional view of the fluid container shown in FIG. 3A taken along section 3B-3B.

FIG. 3C is a detail cross-sectional view of the fluid container shown in FIG. 3B taken along section 3C-3C.

FIG. 4A is an isometric view of a dual tank coolant flush machine according to the present invention.

FIGS. 4B and 4C are a front view and a side view, respectively, of the dual tank coolant flush machine shown in FIG. 4A.

DETAILED DESCRIPTION OF THE PREFERRED EMBODIMENTS

Figure 1A:
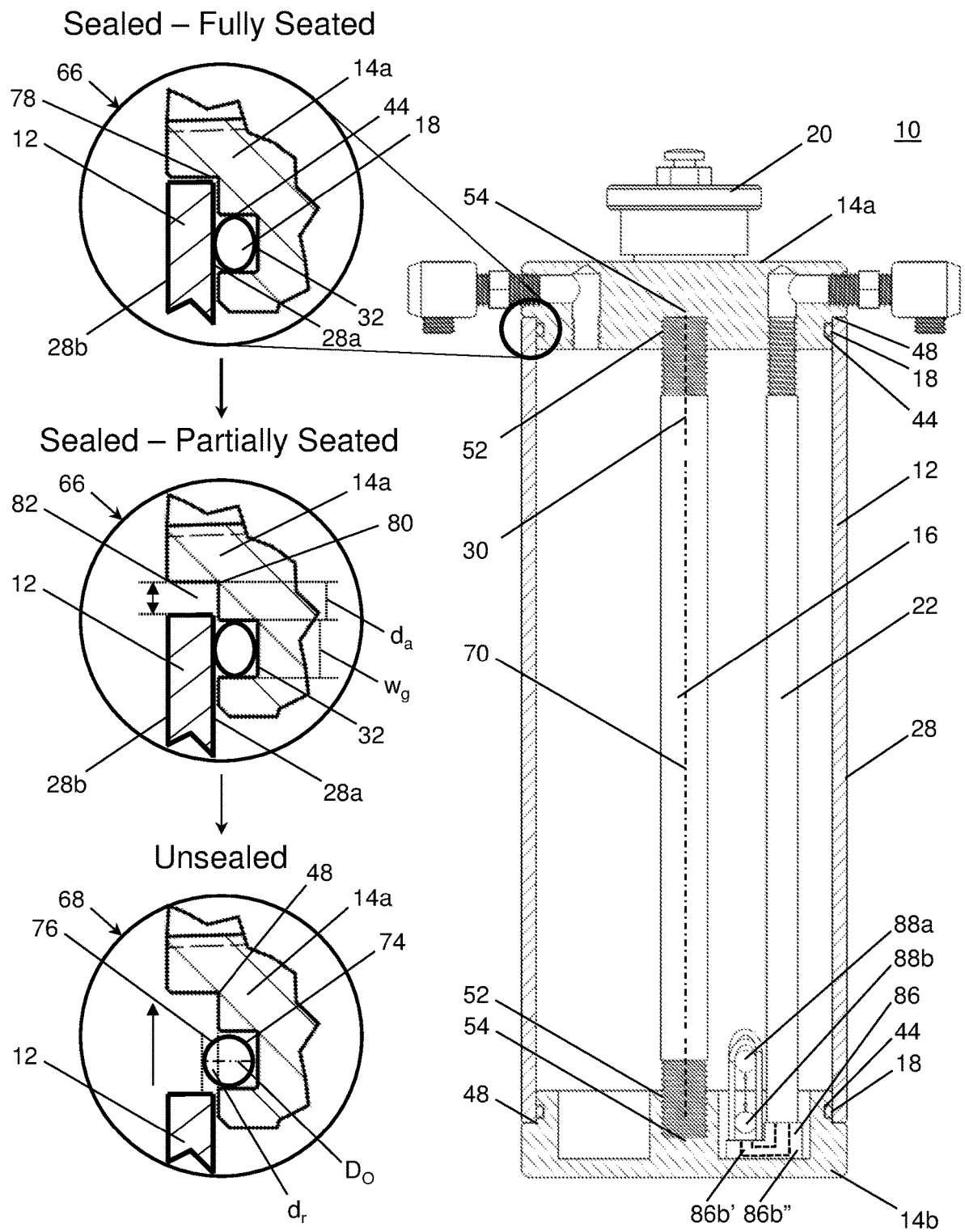
FIG. 1A is a cross-sectional view of a fluid container according to the present invention with detail views of the seal in the fully-seated sealed arrangement, the partially-seated sealed arrangement, and the unsealed arrangement.
Figure 1B:
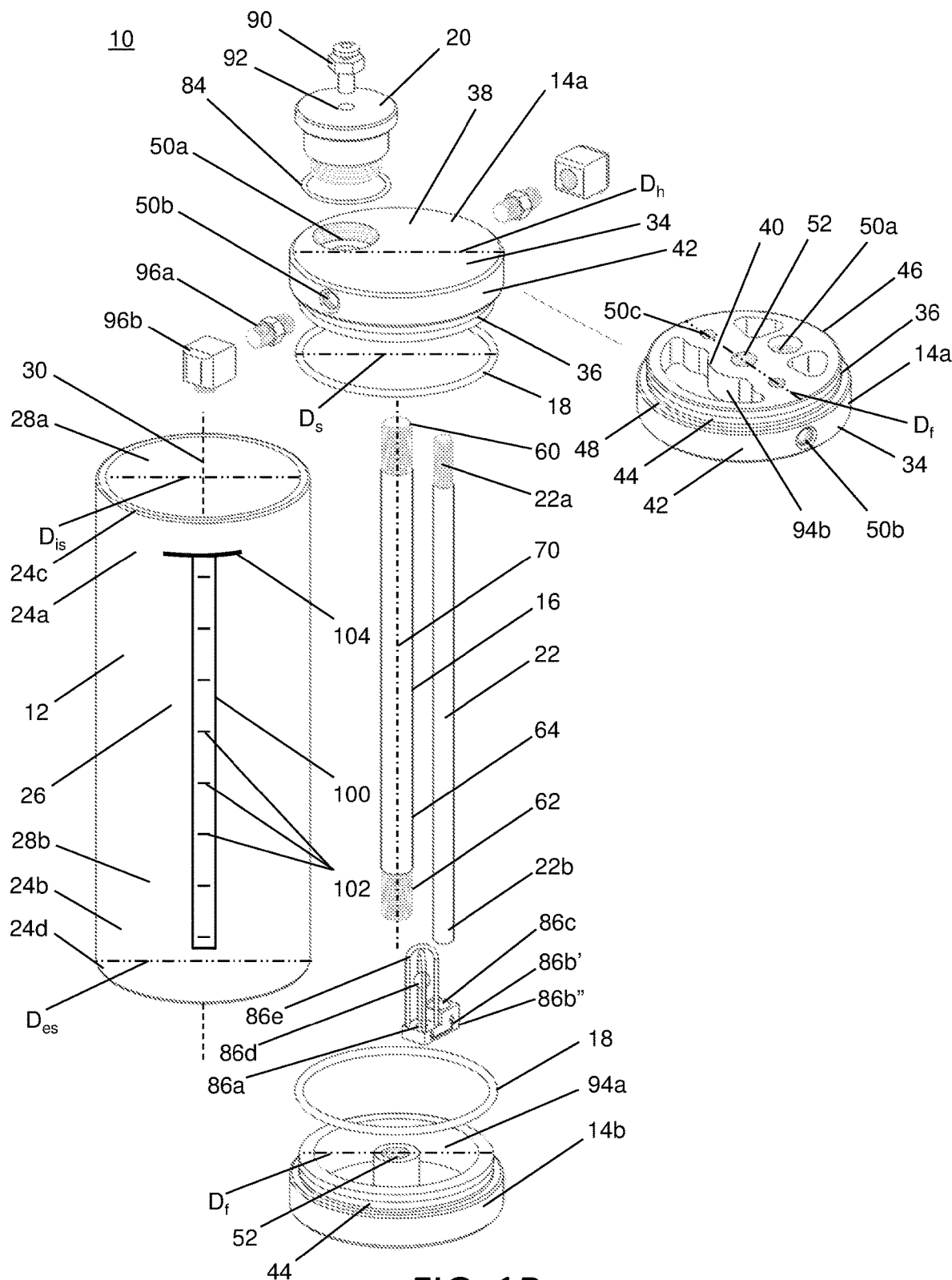
FIG. 1B is an exploded upper perspective view of the fluid container shown in FIG. 1A with a lower perspective view of the top cap.
Figure 1C:
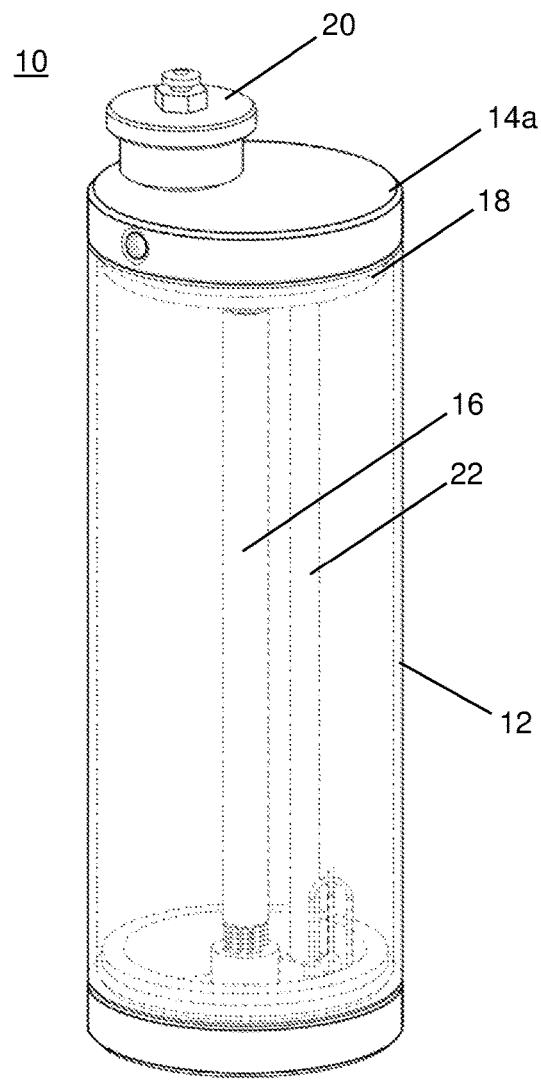
FIG. 1C is an isometric view of the fluid container shown in FIG. 1A.
Figure 1D:
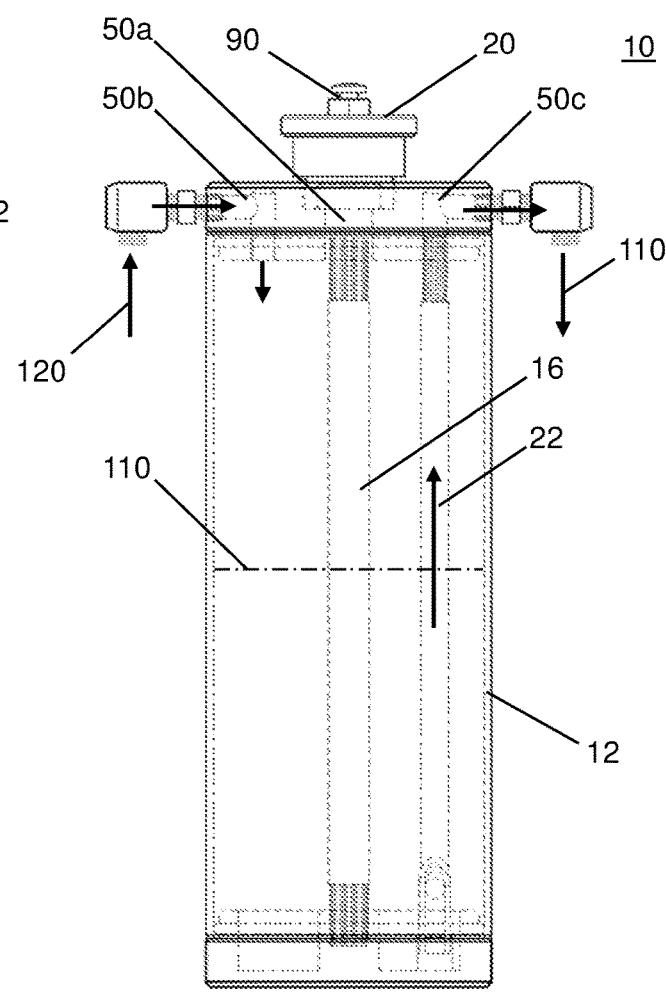
FIG. 1D is a front view of the fluid container shown in FIG. 1A.
Figure 1E:
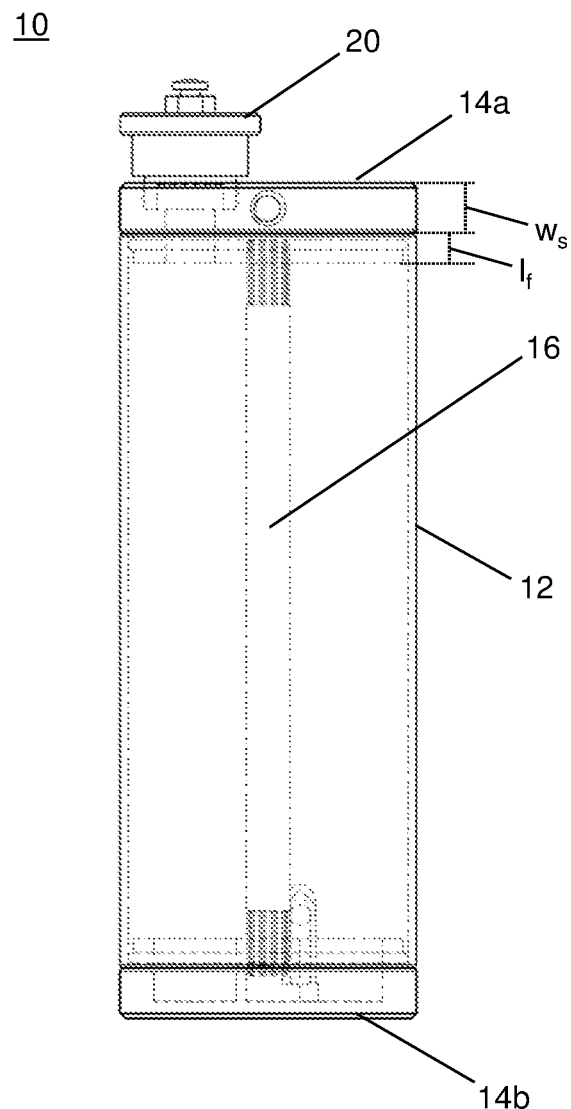
FIG. 1E is a side view of the fluid container shown in FIG. 1A.

The following description of the preferred embodiments is exemplary in nature and does not limit the scope of the invention, its application, or its uses.

Generally, as shown in FIGS. 1A-1E, the fluid container 10 of the present invention has a cylindrical tank 12 with end caps 14a, 14b that are held in place by a single, central tie rod 16 that threads with and secures the end caps on opposite ends 24a, 24b of the container. Each end cap preferably has a head 34 that abuts the respective ends of the tank and a flange 36 that is inserted into the corresponding ends of the tank, and a radially-compressive, annular seal 18 within an annular groove 44 around the flange's outer circumference 46 seals the fluid container between the flange and the tank's interior space. Threaded bores 52 at the center point 54 of the end caps receive the threaded end sections 60, 62 of the internal tie rod, and the end caps are thereby secured to opposite ends of the tank through the tie rod with the longitudinal axis 70 of the tie rod in line with the cylindrical tank's central longitudinal axis 30. Accordingly, the threaded bores function as integral fasteners in the end caps and secure the caps through their engagement with the tie rod without any external fasteners penetrating either end cap, thereby eliminating any fastener apertures through the caps and also avoiding external tie rods outside the container as found in prior art containers. Additionally, since the end caps and the tie rod rotate relative to each other, the end caps can be hand tightened on the tank using the torque of the perimeter side 42 of the end caps without any hand tool needed for the torque.

Figure 1F:
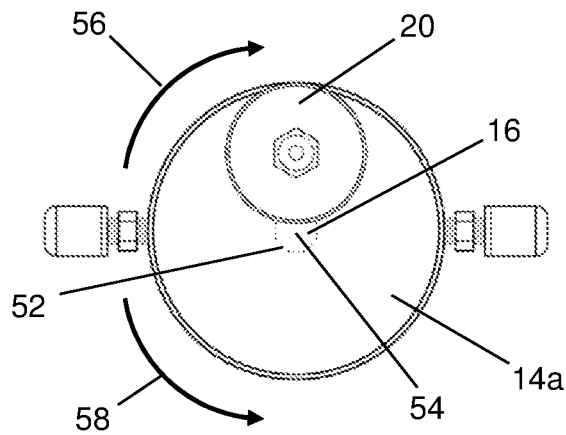
FIG. 1F is a top view of the fluid container shown in FIG. 1A.
Figure 1G:
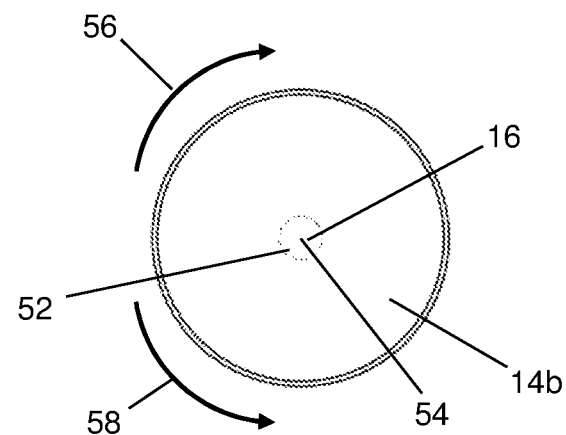
FIG. 1G is a bottom view of the fluid container shown in FIG. 1A.

In assembling the container, the flange of one of the caps could first be fitted into one end of the tank, and the threaded end of the tie rod is then screwed into the threaded bore. The other cap would then be rotated to screw onto the other threaded end of the tie rod, and its flange would be drawn into the other end of the tank. Preferably, the center section 64 of the tie rod is free of any threads although it will be appreciated that the entire length of the tie rod could be threaded. When the head is not seated against the respective end of the tank, the head is rotated in a tightening direction 56 on the tie rod to draw the cap's flange further into the tank until the head engages the end of the tank. To remove the cap from the end of the tank, the head is rotated in a loosening direction 58 to push the cap's flange out of the end of the tank. In the assembly and disassembly of the container, both end caps can also be simultaneously rotated on the tie rod. Rotation of the caps is generally shown in FIGS. 1F and 1G.

In the embodiments shown in FIGS. 1 and 2, access ports 50 are preferably machined in the top cap so that there are no access ports in the bottom cap. As explained below, the bottom cap can have one or more access ports. Additionally, the access ports can be cast, molded, or otherwise formed (3D additive metal manufacturing) in the caps, but machining is preferred. Generally, the access ports 50 include a fill port 50a and process ports, such as an inlet port 50b and an outlet port 50c. In preparing for the operation of the tool, service fluid 110 flows into the tank through the fill port which is preferably threaded, and a threaded plug 20 is secured in the fill port with a seal 84 in a screwed and sealed engagement. In particular, the external threads of the threaded plug engage with the internal threads of the threaded fill port when the plug is in its closed position as shown in FIG. 1A. Fluid can be poured into the tank through the fill port when the plug is in its open position as shown in FIG. 1B. In operation, pressurized air 120 is directed into the tank through the inlet port, and the fluid is pushed out of and/or drawn from the tank through the outlet port.

The annular seal in each one of the end caps is preferably an O-ring which is seated within the groove on the outside diameter of the flange. As the end caps are screwed onto the tie rod and the flanges are drawn into the ends of the tank, the O-ring is radially compressed in the groove between the cap and the interior sidewall 28a of the tank which provides the pressure seal without requiring axially compression of the O-ring against the ends of the container to retain seal integrity. When the end caps are tightened and the head of each cap is seated against respective ends of the tank, the rotational friction provided by the O-ring between the cap and the interior sidewall provides sufficient resistance to prevent the cap from rotating back and loosening the engagement between the cap and the tank and to maintain the integrity of the seal. As explained above, many known fluid containers for servicing vehicles have apertures extending through the caps so the external fasteners can engage one or more tie rods in the tank, whereas the tie rod and integrated threaded bores at the center of the respective caps for the innovative container described herein eliminate the need for additional external fasteners. The used of a single, central tie rod also allows the end caps to be oriented in any direction relative to one another rather than having to be in a particular alignment with each other as is required with containers that use multiple internal tie rods or external tie rods.

The cylindrical tank has an upper end 24a, a lower end 24b, and a middle section 26 and is preferably made as a single, integral structure from a translucent structural material, such as an epoxy and fiber composite, a glass and fiber composite, or a structural plastic. Making the cylindrical tank translucent is beneficial because a technician can visualize and measure the fluid level while the tool is being used so a specific volume of fluids can be metered the progress of the service can be monitored while working at different locations around a vehicle to insure that the service is progressing appropriately and to determine when the service is completed. It will also be appreciated that the particular material used to produce the tank may vary, and the innovative seal and tie rod design described herein can be used in fluid containers which are not translucent, such as in metal containers and possibly plastic containers as long as the material is capable of retaining a pressure of approximately 150 PSI without deforming the interior sidewalls away from the O-ring seals. When the tank is made primarily from metal, it may have a translucent or transparent window to view the fluid level within the container. As explained below, the overall size of the tank may vary relative to the particular use but generally has a length greater than the diameter of the tank. As with known fluid servicing tools, a fluid level indicator 100 with lines of gradation 102 can be attached to or formed on the tank's sidewall 28. Additionally, the fluid level indicator may have a maximum fill line 104.

The caps preferably have a circular head with a diameter ($D_h$) that is greater than the diameter ($D_{is}$) of the tank's interior sidewall 28a and approximately equal to or greater than the diameter ($D_{es}$) of the tank's exterior sidewall 28b, and the circular flanges extend from the head into the ends of the tank. Accordingly, the flange diameter ($D_f$) is less than the diameter of the cap's head ($D_f < D_h$) and is also less than the diameter of the tank's interior sidewall ($D_f < D_{is}$) so that the caps have a shoulder section 48 at the interface between the head and the flange proximate to the ends of the tank. The groove in the flange is preferably spaced from the head by an axial distance ($d_a$) that is preferably greater than half the width ($w_g$) of the groove ($d_a > \frac{1}{2} * w_g$). The spacing between the groove and the head in the present invention is an improvement over the axially-compressed seals in the present invention because the radially-compressed seals in the present invention will maintain the seal between the flange and the interior sidewall of the tank even if the head of the end caps is not directly contacting the corresponding ends of the container as long as the caps remain sufficiently inserted in the ends of the tank such that the grooves in the flanges are substantially or entirely covered by the corresponding ends of the tank. In comparison, fluid containers in the prior art with caps that axially compress O-rings or other annular seals 18 against the ends of the tank would lose pressure when the caps are slightly loosened because the axial compression that is required to maintain the seal would be lost when the head is no longer seated against the end of the tank.

It will be appreciated that the cap's head and flange dimensions will vary relative to the size of the tank. Generally, the flange extends from the head by a length ($l_f$) that is approximately greater than half the width ($w_s$) of the head's sidewall ($l_f > \frac{1}{2} * w_s$). For each one of the caps, the flange extends from the cap's interior side into the tank of the container, and the cap's exterior side faces away from the tank and the opposite cap. Preferably, the axial distance ($d_a$) of the spacing between the groove and the head is greater than one-sixteenth of an inch ($\frac{1}{16}$") and could be approximately one-eighth of an inch ($\frac{1}{8}$") so that when the cap is at a fully-seated point 78 with respect to the tank, i.e., with the flange within the end of tank and the head abutting the end of the tank, the O-ring is situated within the end of the tank by this axial distance. With this sealed arrangement 66, the seal would be maintained even when the cap is at a partially-seated point 80 within the end of the tank with an open circumferential space 82 that is between the end of the tank and the head at the shoulder section and is approximately equal to this axial distance. In the unsealed arrangement 68, the groove of the flange is at least partially exposed outside the end of the tank such that the seal loses the compression between the groove and the interior sidewall. Therefore, it would require a significant loosening of the end cap before the seal integrity would be compromised for the container of the present invention.

The radially-compressed seals of the present invention are so robust that in order for the seal integrity to be impacted, one of the caps would have to be loosened to the point that the head of the cap is spaced away from the end of the tank by a distance that is greater than the spacing between the groove and the head. The seal is still maintained even when the distance of the head from the end is equal to the cross-sectional diameter ($D_O$) of the O-ring. It should also be recognized that in the preferred embodiment of the present invention, the only way for the cap to be loosened from the tank is by rotating the entire cap more than one (1) full rotation on the central tie rod relative to the tank. In comparison, the prior art caps do not need to rotate at all relative to the tank when they come loose because the fasteners extend through apertures in the cap. Accordingly, the seal of the present invention is so robust that its integrity not only remains with some axial movement of the cap relative to the end of the tank, the sealing components of the present invention provide a clear visual indication before there would be any compromise to the integrity of the seal because of the amount of space there would have to be between the head of the cap and the end of the tank, and the sealing components would also provide a clear visual indication before there would be any compromise to the integrity of the sea because of the amount of relative rotation between the front of the tank and the cap.

In one embodiment of the invention, the fluid connections and access ports are preferably made through the top cap on the upper end of the tank so that the bottom of the container can be flat which allows it to be stably set on a bench for operations in filling the tank and performing the service or for storage. The absence of access ports, fluid connections, or external fasteners in the bottom cap not only allows the container to be freestanding with the flat bottom, the absence also allows for the container to be placed in spaces not accessible by containers that have fluid connections extending from the bottom of the container. Rigid couplings or fittings that extend from the bottom of a container must be spaced away from the lip around the topside worksurface of a cart or toolbox and hoses extending therefrom could interfere with other items on the worksurface as well as drawers below the worksurface, whereas the container of the present invention can be placed anywhere on the worksurface, even immediately adjacent to the top lip because the fluid connections are spaced up and away from the worksurface and the flexible hoses can be more easily directed away from equipment on the worksurface and drawers below the worksurface. Since the bottom cap does not have any access ports, it is clear of any structures between the threaded bore at the center of the cap and the interior sidewalls so that it generally has a saucer-shaped space 94a around the threaded bore which is in fluid communication with the tank so it also holds a portion of the fluid.

The top cap includes at least two process ports 50b, 50c, i.e., the inlet port 50b, through which compressed air enters into the container and the outlet port 50c for fluid to flow out of the container. The top cap also has a single threaded fill port that extends between the exterior surface 38 of the top cap through to the top cap's interior surface 40 and the interior space of the tank allowing easy access for filling the container with fluids. The threaded plug with a gasket, O-ring, or other seal is screwed into the threaded fill port to close off the fill port and seal the fill port in the cap. The threaded plug may also include a spring-loaded, pressure-release valve 90 extending through its topside 92 which can be used to ensure that the pressure in the tank is relieved to ambient pressure before opening the fill port. The process ports preferably extend between an external opening through the perimeter side of the top cap's head and an internal opening in the interior space of the head within the interior of the tank, and the interior channels of the process ports preferably have a turn to be directed downwards towards the bottom of the tank. It will be appreciated that the process ports could alternatively be formed in the topside of the cap from the exterior surface to the internal space.

Since the outlet port is preferably situated in the top of the cap, a process tube 22 extends from its proximal end 22a in fluid communication with the internal opening of the outlet port to its distal end 22b in the saucer-shaped interior space of the bottom cap at the lower end of the tank. Fluid fittings and/or couplers are connected to the external opening of the process ports and provide a fluid connection with hoses, valves, pressure gauges, and possibly other devices depending on the intended use of the container. Since the external openings of the process ports are preferably situated in the opposite peripheral sides of the top cap, nipple fittings 96a have one end preferably connected to each one the external openings, and an elbow fitting 96b preferably connects to the other end of the nipple fitting so that hoses and other various attachments can be connected adjacent to the tank body with their arrangement and flow path being generally parallel to the longitudinal axis of the container. The openings in the elbow fitting and the external openings of the process ports are preferably threaded to receive the correspondingly threaded ends of the nipple fittings.

The overall design of the tank and caps is modular such that the same general features of the fluid container can be used for different servicing tools. For example, as explained below with regard to the various attachments that can be used for different service tools, the fuel service tool shown in FIG. 2A includes pressure gauges on each fitting that connects to the process ports. The modular nature of the container also relates to fluid management devices within the interior space of the tank. For example, a float valve assembly 86 can be added to the distal end of the process tube 22b for the power bleed brake service tool shown in FIG. 2C while the other service tools do not necessarily include any valve connected to the process tube within the tank. The internal opening of the outlet port is preferably threaded, and the process tube preferably has a threaded proximal end that screws into the internal opening. The process tube may also have a threaded distal end, and threaded sidewalls of the float valve assembly's exit port can be screwed onto the threaded distal end of the process tube. It will also be appreciated that an adhesive could be used to fasten the float valve assembly to the process tube, or the distal end of the process tube could be bent into a U-shape which would allow the float valve to be fastened to the end of the tube or otherwise formed with or integrated into the end of the tube.

The float valve assembly in the power bleed brake service tool functions as a low liquid level shut-off valve to automatically close the valve when the brake fluid level in the container gets too low. When the fluid level gets too low, the valve closes the outlet port and protects against air being forced into the brake lines of the vehicle. Prior art brake service tools that have an outlet port at the bottom of the tank may also have a valve, but there is no process tube so the valve is positioned directly over the outlet port's internal opening. The float valve assembly 86 in the present invention allows fluid to enter the float valve through an upwardly facing entrance port 86a and pass through an internal passageway 86b' in the base 86b" of the float valve assembly before flowing through the exit port 86c into the process tube. The ball float 86d is held in position at the end of the valve assembly, preferably being held by a cage 86e that is preferably made from U-shaped wires that are connected to the assembly around the valve's entrance port. In the valve's open configuration 88a, the ball float is lifted away from the entrance port as it floats in the fluid. As the fluid level in the tank drops, the ball float descends and the valve transitions to its closed configuration 88b when the ball float covers the entrance port. It will be appreciated that other connection devices or cages could be used to hold the ball float at the end of the process tube, and other types of low-level valves could be used in combination with the process tube of the present invention.

To provide an airtight seal and maintain pressure within the container, the radially-compressive, annular seal 18 contacts the entire circumference of both the tank's interior sidewall 28a and the base of the groove 32 in the sealed arrangement 66. An inwardly-facing portion 74 of the annular seal is seated within the annular groove in the flange and an outwardly-facing portion 76 of the annular seal radially protrudes out from the groove by a radial distance ($d_r$) to a seal outer diameter ($D_s$) that is greater than the diameter of the tank's interior sidewall ($D_s > D_{is}$), and as the cap is rotated on the central tie rod and the flange is inserted into the end of the tank, the annular seal is radially compressed between the groove and the tank's interior sidewall. When the caps are in the unsealed arrangement 68, the pair of annular seals are not radially compressed around an entire circumference of the interior sidewall. Accordingly, the O-rings have an outer diameter that is greater than the diameters of the flange and the tank's interior sidewall when the O-rings are seated within the corresponding grooves in the unsealed arrangement. The O-rings are lightly lubricated and drawn inside the tank as the end caps rotate on the threaded ends of the tie rod as described above. As the end caps are tightened, the flanges are pulled into the fluid container creating the seal on the inside of the container with the O-ring being radially compressed by the tank's interior sidewall as it is seated in the flange's groove. The head on each of the end caps is preferably pulled against and abuts the respective end of the container when the flange is fully drawn into the end of the tank.

Figure 2A:
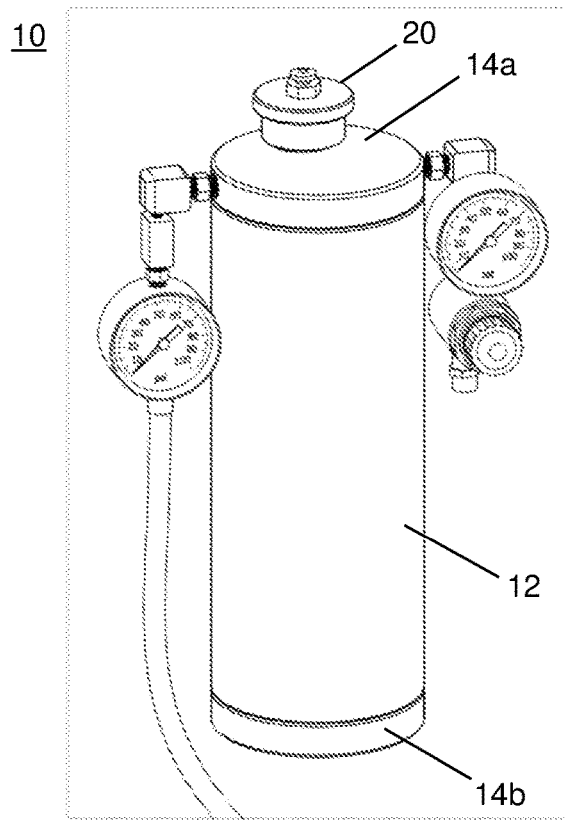
FIG. 2A shows the fluid container according to the present invention with connections for a fuel servicing tool.
Figure 2B:
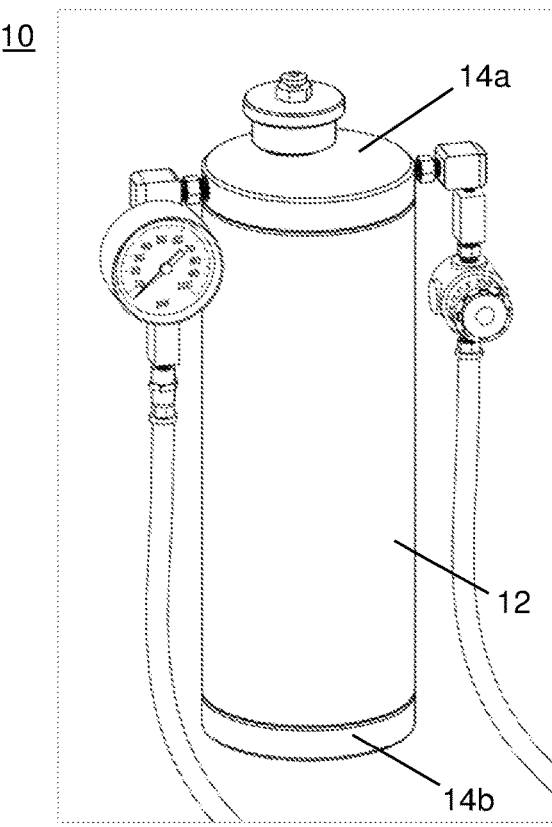
FIG. 2B shows the fluid container according to the present invention with connections for a diesel induction and EGR servicing tool.

It will be appreciated that the fluid container and seal described herein is capable of maintaining a pressure differential that is a higher pressure or lower pressure relative to the ambient pressure on the outside of the container. Accordingly, it will be understood that the fluid container and seal described herein can be used in tools using a vacuum service. For example, fuel servicing tools such as shown in FIG. 2A that connect to a gas engine vacuum port and pull cleaning solution into the port instead of pressurizing the tool and forcing fluid through the throttle body with an attached spray nozzle are generally known and may incorporate the fluid container described herein. Accordingly, the fluid container and seal may also maintain a vacuum or may be used under a vacuum, no vacuum or maintain an internal pressure greater than the ambient pressure as described above. Generally, various valves, gauges, filters, and other devices are connected to the fittings extending from the process ports depending on the particular servicing to be performed by the tool. In another example of modular features that may be connected to the process ports in the top cap, a quick release pressure nozzle can be combined with fluid containers for access mixing nozzles on diesel induction and EGR tools as shown in FIG. 2B to allow easier service of the internal pressure nozzle. The power bleed brake service tool mentioned above and shown in FIG. 2C has a quick-change fitting for a pneumatic hose that is connected to the inlet port through a pressure gauge, a valve, and a coalescing filter to remove moisture from pressurized shop air and has a simple fitting attached to the outlet port for a fluid service hose and has another quick-change fitting that allows for different applicators to be attached to the hose for different makes and models of vehicles. Similarly, the oil servicing tool shown in FIG. 2D has fittings for the pneumatic hose providing the pressurized air and for the oil to be directed to the vehicle's engine through the process hose and terminal end applicator.

Since the innovative container design of the present invention uses fewer parts than previous fluid exchange tools in the prior art, the innovative container can be assembled more quickly and easily while providing a lower risk of seal failure than the previous tools. The simpler and more efficient design also allows the size and weight of the new tool to be significantly less than other products that reduces the effort required to handle and use the tool. To further reduce the weight of the overall tool, metal end caps are preferably made from machined aluminum with hollowed out sections, such as the saucer-shaped portion in the bottom cap and the open spaces 94b in the top cap. With the improved materials, the elimination of separate fasteners for the tie rods, the reduction of tie rods to a single, central tie rod, and the caps' hollowed out sections, the container's empty weight is approximately sixty percent (60%) or more lighter than comparable prior art containers.

Providing smaller and lighter containers makes it easier for the tools to be hung in multiple locations from mounting hooks throughout a service shop. Accordingly, the multiple tools located around a shop provides technicians quick access and reduces the time required to perform individual services, which thereby increases shop capacity and efficiency. Further, lowering the cost of tools in comparison to larger service machines allows shops to easily acquire multiple tools to increase the service capacity at a much lower cost than using larger machines. Accordingly, with lower profile tools that are easy to use, multiple tools for particular uses can be used within a shop and thus services can be run in parallel rather than in series where current machines are too large to effectively perform more than approximately two combined services at a time. For example, new fluids and waste fluids must be manually loaded and unloaded from machines. In comparison, service cells that incorporate multiple tools for particular uses will provide automated feed and disposal of fluids. In operation, a service cell will reduce the wasted time getting and returning equipment to a tool room and thereby keep technicians focused on performing services. Subsequently, labor costs and required service times may be reduced by approximately 50% which provides service companies a competitive advantage over competitors.

Although the tank, caps, and seal described herein are preferably designed to be used with a single, central tie rod, it will also be appreciated that the cap design and radially-compressive, annular seal described herein may be used in combination with one or more external tie rods. For example, mounting brackets may be affixed to the head of the caps or on the exterior side of the caps, opposite from the interior side of the caps having the flange. Tie rods can extend between the external brackets on the outside of the container and sufficiently hold the caps over the respective ends of the container without introducing additional apertures in the caps that may threaten seal integrity. Accordingly, persons having an ordinary skill in the art will understand that a primary aspect of the container, cap and seal combination described herein is the elimination of multiple access points to necessarily fasten the caps over the respective ends of a fluid container byway of a providing a flange and annular seal. Regardless of whether the cap is held onto the tank by the internal tie rod or external tie rods, the radially-compressive, annular seal of the present invention can hold a pressure of approximately 150 PSI or more within the fluid container which exceeds pressure ratings from traditional air systems and tools in the prior art that generally only allow for maximum pressures of 100 PSI or less.

Figure 2C:
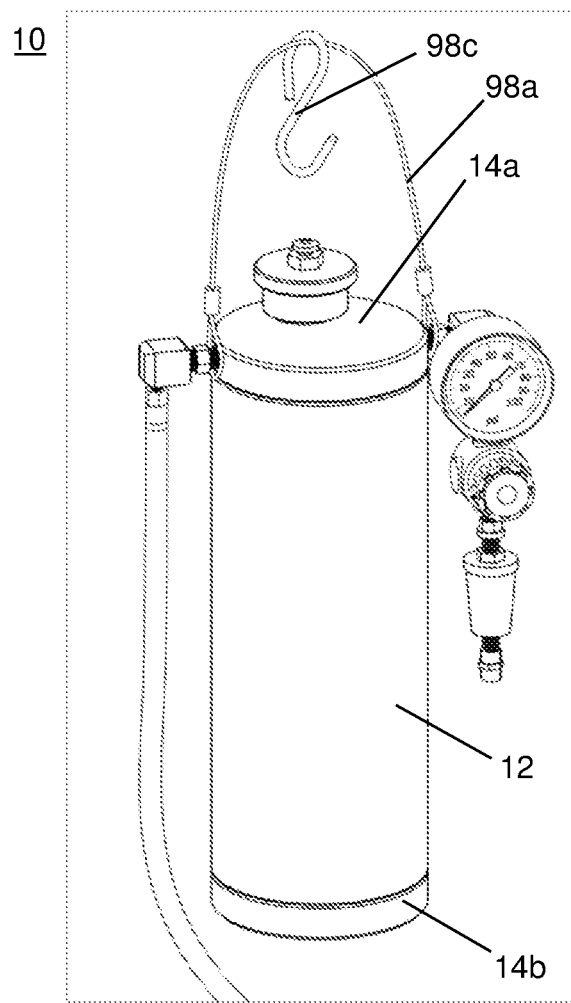
FIG. 2C shows the fluid container according to the present invention with connections for a brake servicing tool.
Figure 2D:
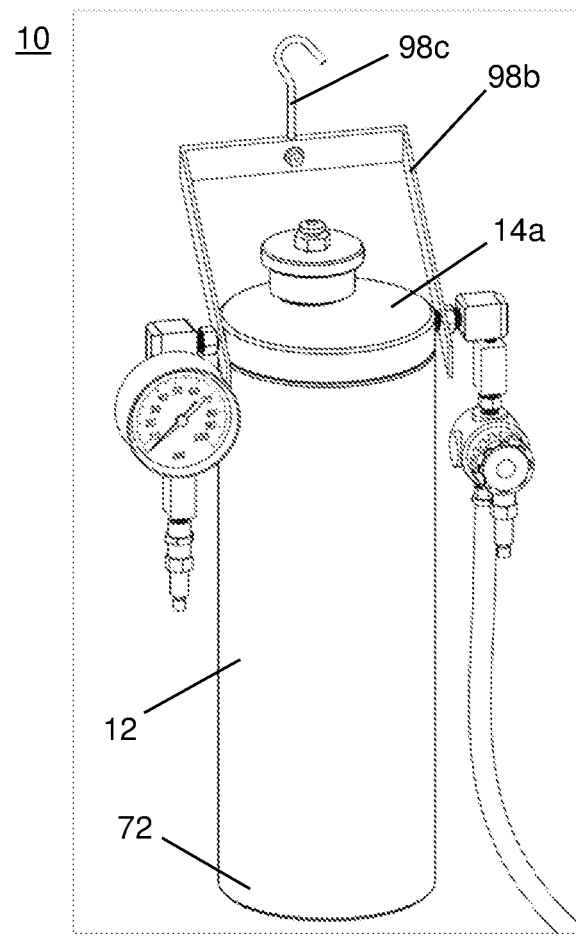
FIG. 2D shows the fluid container according to the present invention with connections for an oil servicing tool.

The preferred embodiment of the cylindrical tank 12 is open on both ends with a top cap and a bottom cap forming the container's sealed top side 24c and the sealed bottom side 24d, respectively, and it will also be appreciated that the cylindrical tank 12 can be formed as a cylindrical canister with a fixed, permanently-sealed bottom 72 as generally shown in FIG. 2D so that only a top cap is required to fully seal the container. Such a cylindrical fluid canister may have an integral bottom section with an integral threaded bore. In such a canister-type container, the single, central tie rod and/or the radially-compressive, annular seal in the top cap can be used to seal the container and provide for the process ports and the fill port. The canister may be metal with a threaded bore at the center of the canister's bottom or may be formed primarily from epoxy material, and the threaded bore could be formed by a metal plug that is embedded within the epoxy material in the canister's bottom. Although not preferred, it is also possible for the bottom end of the tie rod to be permanently fastened to the bottom of the canister-type container. It will also be appreciated that the container with the single, central tie rod and/or the radially-compressive, annular seal may be mated with a cart or otherwise incorporated into a servicing machine. For example, the tool can be integrated with a cart having pneumatic suction or as a separate pressure only power bleed tool. Accordingly, the scope of the present invention includes incorporating either the single, central tie rod or the radially-compressive, annular seal into other servicing tools and machines, especially as suggested herein.

As indicated above, the cylindrical tank may have various diameters depending on the particular use of the container. For example, cylindrical tanks for vehicle servicing as described herein may range in diameter from one inch (1") for smaller automotive servicing tools to six inches (6") for larger automotive servicing tools. Larger containers may also be used in dual container designs wherein a smaller internal tank is positioned inside the larger outside tank to provide two (2) separate and independent tank spaces. In operation, the smaller interior tank is preferably used as a suction or waste tank and the larger outer tank would hold new fluids. Accordingly, a single tool could provide both suction and pressure in a single tool. Further, where it is an aspect of the fluid container described herein to be moveable and lightweight, it would be appreciated that larger fluid containers, for example a container used in a sixty-four ounce (64 oz.) service tool, could be mounted on a cart or similar service machine. As shown in FIGS. 4A-4C and 5 and described in detail below, it will be appreciated that the servicing tools could be positioned within a cart 200, such as on a shelf 210 below the top surface 220. When the container of the present invention is integrated into service machine, it may be advantageous for the outlet port to extend through the sealed bottom side as in current service machine designs, although a bottom side outlet port is not necessary in such a use of the container. As with other automotive service tools, a hanger can also be connected to the top end cap to allow the container to be hung on a stand or other mount. As shown in FIG. 2C, the hanger can be a cable 98a with crimped end loops that are placed around the nipple fittings that extend from the process ports in opposite peripheral sides of the top cap. Other hangers can also be used, such as the bent metal strip 98b shown in FIG. 2D. As shown in these examples, the hanger can also have a hook 98c.

An example of a bottom side outlet port 50c is shown by the embodiment illustrated in FIG. 3A. In this embodiment, the servicing tool's fluid container 10 also has an inlet port 50b extending through the bottom cap 14b. With the inlet port extending through the bottom port, the process tube 22 preferably connects to the inlet port so that the pressurized air is directed up to the top of the fluid container without having to pass through the fluid. Without the tube to direct the pressurized air to the top of the container, it is possible that some of the air could mix with the fluid which may result in air in the lines and reduce the effectiveness of the fluid. As particularly shown in FIG. 3B, the tube extends from its bottom proximal end 22a in fluid communication with the inlet port to its top distal end 22b proximal to the top cap of the fluid container. The top of the tube is preferably above a maximum fill line for the fluid. Preferably, the top of the tube is spaced from the top cap's interior surface 40 by a distance ($d_s$) that is greater than a quarter the process tube's diameter ($D_t$) and less than twice the process tube's diameter ($\frac{1}{4}*D_t < d_s < 2*D_t$).

With the inlet and outlet ports extending straight down through the bottom cap and the fill port extending straight up through the top cap, the thickness of the flange portions of the caps can be significantly reduced as compared with the version of the fluid container described above with reference to FIGS. 1 and 2 in which the inlet and outlet ports extend up into the top cap and out through the perimeter side of the top cap. It will also be appreciated that inlet and outlet ports that extend straight up through the top cap would also allow the thickness of the top cap to be similarly reduced.

The embodiment with the bottom side inlet and outlet ports also shows a slightly different sealing design between the fill plug 20 and the fill port 50a as compared with the version of the fluid container described above with reference to FIGS. 1 and 2. In both versions of the fluid container, the O-ring seal 84 is compressed between the shoulder of the fill plug and a chamfer in the top flange. In the embodiments shown in FIGS. 1 and 2, the chamfer is at the exterior surface of the top flange so the O-ring remains visible when the fill plug is screwed into the top flange. As particularly shown in FIGS. 3B and 3C, the chamfer can be recessed below the exterior surface of the top flange so the O-ring is not visible when the fill plug is screwed into the top flange.

Figure 5:
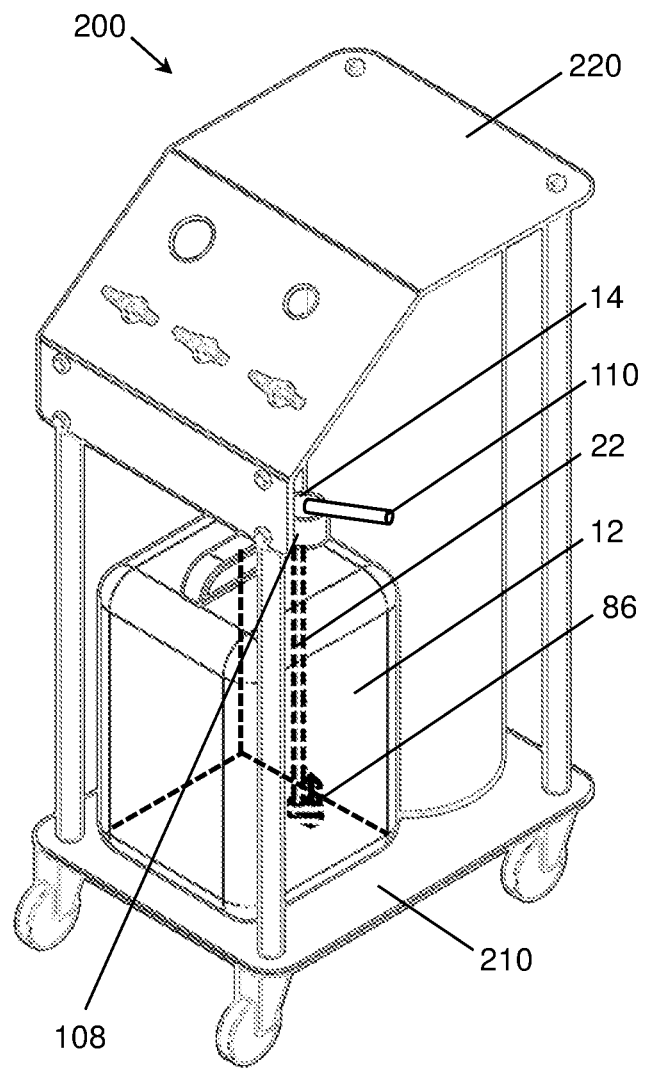
FIG. 5 is an isometric view of a vacuum flush machine according to the present invention.

Returning back to the process tube and float valve assembly, it will be appreciated that this innovative aspect of the container can be incorporated into current fluid servicing tools and other equipment, such as the hydraulic fluid flushing system disclosed in the '894 patent. The process tube and float valve assembly can be incorporated into a dual tank coolant flush machine as shown in FIGS. 4A-4C that can use a shop's air pressure service as disclosed above for the fluid servicing tools or can function using a vacuum service as described in the '894 patent. As particularly shown in FIG. 4b, an outlet port 50c preferably extends through the side of the cap as described above with reference to FIGS. 1A-1G and a tube 106 can extend to the back of the cart 200. The fluid flush machine shown in FIG. 5 is designed to only connect to a vacuum service, and as in the '894 patent, the cap 14 at the top side of the tank 12 in this embodiment can include an adapter 108 and an intake tube 110.

The tanks used for the coolant flush machine preferably have an eight inch (8") diameter rather than the more standard six inch (6") diameter tank. The larger diameter tank is more economical than the standard smaller diameter tank because the smaller diameter tank is forty-eight inches (48") in length, i.e., four feet (4'), and the composite mandrel is ten feet (10'). Therefore, with the 4-foot tube, only two (2) tubes can be made from the 10-foot size, and there is a 2-foot scrap section that is thrown away so the material cost for producing the 4-foot tube is the same as a 5-foot tube. In comparison, the larger diameter tank can be cut into four (4) sections with each section being almost thirty inches (30") in length so the total volume of the shorter, larger diameter tank (3.5 cu. ft.) is approximately the same as the longer, smaller diameter tank (3.1 cu. ft.) without any wasted material. The shorter length tank also allows the top of the cart to be around three feet (3') tall as compared to many current ones are over four feet (4') tall. The reduced length also makes the machine easier to box and ship because it is easier for the distributors to get in low roof vans for delivery. Further, the shorter length tank results in a center of gravity (CG) for the equipment that, at its highest ($CG_H$), is less than a radius distance (R) above the midline (ML) of the tank for the new fluid when the tank is full. This highest center of gravity corresponds to being more than a diameter and a half distance (D+R) below the topside worksurface.

For the vacuum service, one tank is vacuum for old fluid and the second tank is new fluid for refill. However, prior art fluid servicing machines did not have a way to shut off the flow when empty whereas the float valve in the present invention automatically stops the flow when the new fluid tank drops close to empty. With fully mechanical prior art fluid servicing machines, the technician had to watch and time the shut off manually when the fluid was low. As discussed above with reference to the '894 patent, some prior art fluid servicing machines have incorporated an electric pump and a level switch that can turn off the pump when the fluid level gets too low. However, rather than having fluid servicing equipment that requires electrical power for sensors and a control panel, the incorporation of the float valve into the fluid tank in the present invention results in a fully mechanical fluid servicing machine in which the entire servicing can be performed using pressure or vacuum from the shop or the vehicle without requiring any power cords or a control system while also providing a mechanical check valve that prevents air from being pushed or drawn into the vehicle lines if the fluid in the reservoir runs dry.

It will also be appreciated that with adapters to connect to the vehicle for a pressure flush, the fluid servicing equipment of the present invention will be able to pressurize the new fluid tank and the flow back out of the engine would go into the used fluid tank. The technician should shut off the service as soon as the new fluid has been pushed out, but the float valve will mechanically stop the fluid flow which gives the technician some time to ensure the service is complete before any air would be pushed into the engine. With incorporation of the float valve into the tanks of the present invention, there is no need for any power cords or any electrical control system so the fluid servicing equipment is fully mechanical.

The float valve assembly on the bottom of the process tube in the tank for the new fluid. The fluid servicing equipment can be used for vacuum service as well as pressurized air service, power flush service. On the power flush operation for brake fluid, when the new fluid tank drops close to empty, the ball in the float valve assembly drops with the fluid until it falls onto and covers the upwardly facing entrance port, shutting off the fluid flow and preventing air from being pushed into the brake system. With the vacuum service for coolant fluid, the ball similarly drops with the fluid level until it falls onto and covers the upwardly facing entrance port with the suction of the vacuum service sealing the ball on the entrance port, thereby shutting off the fluid flow and preventing the air in the tank from being sucked into the cooling system.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the terms top and bottom are not intended to be limiting, and other tools may have different orientations, such as a horizontal tank with a fill port that can extend through the end cap with the process ports or can extend out of a top side of the tank. Additionally, other servicing tools can use the innovative container of the present invention when providing or exchanging fluids that are used in various vehicle systems, such as power steering fluid tools, coolant system tools, and transmission system tools. It will also be appreciated that in some applications, the inlet port may extend through the top cap with the fill port while the outlet port extends through the bottom cap. Thus, the breadth and scope of the present invention should not be limited by any of the above-described exemplary embodiments, but should be defined only in accordance with the following claims appended hereto and their equivalents.

What is claimed is:

1. A container for a fluid servicing tool; comprising:
a tank comprising an upper end, a lower end, a middle section between the upper end and the lower end, and an interior space, wherein the lower end comprises a bottom of the tank, wherein the upper end is comprised a cap at a top side of the tank and a first container port extending through the cap, and wherein the cap provides the tank with a sealed arrangement when the cap is secured on the top side of the tank and an unsealed arrangement when the cap released from the top side of the tank;
a process tube extending through the interior space of the tank between a proximal end at the first container port to a distal end in the lower end of the tank; and
a float valve assembly connected to the distal end of the process tube, wherein a base of the float valve assembly is positioned at the bottom of the tank when the tank is in the sealed arrangement and is spaced away from the bottom of the tank when the tank is in the unsealed arrangement.

2. The container of claim 1, wherein the float valve assembly is further comprised of a ball float, wherein the base of the float valve assembly is comprised of an entrance port, an exit port, and an internal passageway in fluid communication between the entrance port and the exit port, wherein the ball float moves between an open configuration and a closed configuration, wherein the ball float is spaced away from the entrance port in the open configuration, wherein the ball float covers the entrance port in the closed configuration, and wherein the distal end of the process tube is connected to and is in fluid communication with the exit port of the float valve assembly.

3. The container of claim 2, wherein the float valve assembly further comprises a cage surrounding the ball float and the entrance port.

4. The container of claim 2, wherein the tank is cylindrical with an interior sidewall having a sidewall diameter, wherein the cap is further comprised of a threaded fill port, a second container port, and a threaded fill plug, wherein the threaded fill port extends through the top side of cap and the threaded fill plug has an open position when not engaged with the threaded fill port and a closed position when engaged with the threaded fill port, wherein the first container port extends through the cap at a first location spaced a first distance away from the threaded fill port, and wherein the second container port extends through the cap at a second location spaced a second distance away from the threaded fill port.

5. The container of claim 4, wherein the cap further comprises a head and a flange, wherein the head has a first diameter, wherein the flange has a second diameter and is comprised of an annular groove and an annular seal fitted within the annular groove, wherein the first diameter is greater than the second diameter and forms a shoulder section between the head and the flange, wherein the shoulder section is positioned proximate to the upper end of the tank, wherein the flange extends a length from the head into the upper end of the tank proximate to the interior sidewall, wherein the first container port is an outlet port through which a fluid contained in the tank flows out of the tank when the fluid supports the ball float in the open configuration and is prevented from flowing out of the tank when the fluid drops to a low level and allows the ball float to fall into the closed configuration, and wherein the second container port is an inlet port through which a pressurized air enters the tank.

6. The container of claim 5, further comprising a tie rod comprising a top end, a bottom end, and a center section between the top end and the bottom end, wherein the bottom end is connected to the bottom of the tank, wherein the top end is threaded, wherein the tank has a central longitudinal axis, wherein the cap is further comprised of a top threaded bore in the interior space of the tank at a center point aligned with the central longitudinal axis of the tank, wherein the threaded fill port, the first container port, and the second container port are positioned on the cap at locations offset from the center point, wherein the tie rod has a longitudinal axis in line with the central longitudinal axis of the tank, wherein the top end of the tie rod is threaded and is screwed into the top threaded bore, wherein the cap moves axially towards the upper end of the tank to produce the sealed arrangement, wherein the top cap moves axially away from the upper end of the tank to produce the unsealed arrangement, wherein the annular seal comprises a first portion positioned within the annular groove and a second portion protruding a radial distance out of the annular groove to a third diameter, wherein the second portion is in contact with and radially compressed by the interior sidewall in the sealed arrangement, and wherein the third diameter is greater than the sidewall diameter in the unsealed arrangement.

7. The container of claim 2, wherein the top side of the tank further comprises a fill port spout, wherein the cap covers the fill port to produce the sealed arrangement for the tank, and wherein the top uncovers the fill port to produce the unsealed arrangement for the tank.

8. The container of claim 7, wherein the fill port spout projects upward from the top side away from the bottom of the tank.

9. The container of claim 7, wherein the cap is further comprised of an input line adapter in fluid communication with the first container port and the process tube.

10. The container of claim 9, wherein a vacuum draws a fluid in the tank through the ball float assembly and the process tube to the input line adapter when the fluid supports the ball float in the open configuration and is prevented from drawing the fluid out of the tank when the fluid drops to a low level and allows the ball float to fall into the closed configuration.

11. A container for a fluid servicing tool; comprising:
a tank comprising an upper end, a lower end, a middle section between the upper end and the lower end, and an interior space, wherein the lower end comprises a bottom of the tank, wherein the upper end is comprised a cap at a top side of the tank and a first container port extending through the cap, and wherein the cap provides the tank with a sealed arrangement when the cap is secured on the top side of the tank and an unsealed arrangement when the cap released from the top side of the tank;
a process tube extending through the interior space of the tank between a proximal end at the first container port to a distal end in the lower end of the tank; and
a float valve assembly connected to the distal end of the process tube, wherein a base of the float valve assembly is positioned at the bottom of the tank when the tank is in the sealed arrangement and is spaced away from the bottom of the tank when the tank is in the unsealed arrangement, wherein the float valve assembly has a closed configuration when a fluid in the tank is at or below a low level, and wherein the float valve assembly has an open configuration when a fluid in the tank has a fluid level above the low level.

12. The container of claim 11, wherein the float valve assembly is further comprised of a ball float and a cage, wherein the base of the float valve assembly is comprised of an entrance port, an exit port, an internal passageway in fluid communication between the entrance port and the exit port, wherein the cage surrounds the ball float and the entrance port, wherein the ball float moves between the open configuration and the closed configuration, wherein the ball float is spaced away from the entrance port when the fluid in the tank is above the low level and supports the ball float in the open configuration, wherein the ball float covers the entrance port in the closed configuration when the fluid drops to the low level and allows the ball float to fall into the closed configuration, and wherein the distal end of the process tube is connected to and is in fluid communication with the exit port of the float valve assembly.

13. The container of claim 12, wherein the tank is cylindrical with an interior sidewall having a sidewall diameter, wherein the cap is further comprised of a threaded fill port, a second container port, and a threaded fill plug, wherein the threaded fill port extends through the top side of cap and the threaded fill plug has an open position when not engaged with the threaded fill port and a closed position when engaged with the threaded fill port, wherein the first container port extends through the cap at a first location spaced a first distance away from the threaded fill port, and wherein the second container port extends through the cap at a second location spaced a second distance away from the threaded fill port.

14. The container of claim 13, wherein the cap further comprises a head and a flange, wherein the head has a first diameter, wherein the flange has a second diameter and is comprised of an annular groove and an annular seal fitted within the annular groove, wherein the first diameter is greater than the second diameter and forms a shoulder section between the head and the flange, wherein the shoulder section is positioned proximate to the upper end of the tank, wherein the flange extends a length from the head into the upper end of the tank proximate to the interior sidewall, wherein the first container port is an outlet port through which the fluid contained in the tank flows out of the tank when the ball float is in the open configuration and is prevented from flowing out of the tank when the ball float to fall into the closed configuration, and wherein the second container port is an inlet port through which a pressurized air enters the tank.

15. The container of claim 12, wherein the top side of the tank further comprises a fill port spout projecting upward from the top side away from the bottom of the tank, wherein the cap covers the fill port to produce the sealed arrangement for the tank, and wherein the top uncovers the fill port to produce the unsealed arrangement for the tank.

16. The container of claim 15, wherein a vacuum draws the fluid in the tank through the ball float assembly and the process tube to the input line adapter when the fluid supports the ball float in the open configuration and is prevented from drawing the fluid out of the tank when the fluid drops to the low level and allows the ball float to fall into the closed configuration.

17. A container for a fluid servicing tool; comprising:
a tank comprising an upper end, a lower end, a middle section between the upper end and the lower end, and an interior space, wherein the lower end comprises a bottom of the tank, wherein the upper end is comprised a cap at a top side of the tank and a first container port extending through the cap, and wherein the cap provides the tank with a sealed arrangement when the cap is secured on the top side of the tank and an unsealed arrangement when the cap released from the top side of the tank;
a process tube extending through the interior space of the tank between a proximal end at the first container port to a distal end in the lower end of the tank; and
a float valve assembly connected to the distal end of the process tube, wherein the float valve comprises a ball float, a base with an entrance port and an exit port and an internal passageway in fluid communication between the entrance port and the exit port, and a cage surrounding the ball float and the entrance port, wherein the base of the float valve assembly is positioned at the bottom of the tank when the tank is in the sealed arrangement and is spaced away from the bottom of the tank when the tank is in the unsealed arrangement, wherein the float valve assembly has a closed configuration when a fluid in the tank is at or below a low level, and wherein the float valve assembly has an open configuration when a fluid in the tank has a fluid level above the low level.

18. The container of claim 17, wherein the tank is cylindrical with an interior sidewall having a sidewall diameter, wherein the cap is further comprised of a threaded fill port, a second container port, and a threaded fill plug, wherein the threaded fill port extends through the top side of cap and the threaded fill plug has an open position when not engaged with the threaded fill port and a closed position when engaged with the threaded fill port, wherein the first container port extends through the cap at a first location spaced a first distance away from the threaded fill port, and wherein the second container port extends through the cap at a second location spaced a second distance away from the threaded fill port.

19. The container of claim 18, wherein the cap further comprises a head and a flange, wherein the head has a first diameter, wherein the flange has a second diameter and is comprised of an annular groove and an annular seal fitted within the annular groove, wherein the first diameter is greater than the second diameter and forms a shoulder section between the head and the flange, wherein the shoulder section is positioned proximate to the upper end of the tank, wherein the flange extends a length from the head into the upper end of the tank proximate to the interior sidewall, wherein the first container port is an outlet port through which the fluid contained in the tank flows out of the tank when the ball float is in the open configuration and is prevented from flowing out of the tank when the ball float to fall into the closed configuration, and wherein the second container port is an inlet port through which a pressurized air enters the tank.

20. The container of claim 17, wherein the top side of the tank further comprises a fill port spout projecting upward from the top side away from the bottom of the tank, wherein the cap covers the fill port to produce the sealed arrangement for the tank, and wherein the top uncovers the fill port to produce the unsealed arrangement for the tank.

* * * * *